(12) United States Patent
Roy et al.

(10) Patent No.: US 12,358,613 B2
(45) Date of Patent: Jul. 15, 2025

(54) BLADE TIP VORTEX CONTROL

(71) Applicant: University of Florida Research Foundation, Inc., Gainesville, FL (US)

(72) Inventors: Subrata Roy, Gainesville, FL (US); Sarthak Roy, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 87 days.

(21) Appl. No.: 17/916,292

(22) PCT Filed: Mar. 31, 2021

(86) PCT No.: PCT/US2021/025035
§ 371 (c)(1),
(2) Date: Sep. 30, 2022

(87) PCT Pub. No.: WO2021/202629
PCT Pub. Date: Oct. 7, 2021

(65) Prior Publication Data
US 2023/0137457 A1 May 4, 2023

Related U.S. Application Data (60) Provisional application No. 63/004,582, filed on Apr. 3, 2020.

(51) Int. Cl.
*B64C 21/00* (2023.01)
*B64C 21/04* (2023.01)
(Continued)

(52) U.S. Cl.
CPC ............ *B64C 21/08* (2013.01); *B64C 21/04* (2013.01); *B64C 21/06* (2013.01); *B64C 23/06* (2013.01); *F15D 1/12* (2013.01); *H05H 1/2439* (2021.05)

(58) Field of Classification Search
CPC ......... B64C 21/08; B64C 21/04; B64C 21/06; B64C 23/06; B64C 23/065; B64C 27/463;
(Continued)

(56) References Cited

U.S. PATENT DOCUMENTS

| 8,016,246 B2 | 9/2011 | Schwimley et al. |
| 8,226,047 B2 * | 7/2012 | Gupta ................... B64C 23/005 244/199.3 |

(Continued)

FOREIGN PATENT DOCUMENTS

| CN | 101913426 B | 8/2013 |
| DE | 102006008864 B4 | 8/2013 |

OTHER PUBLICATIONS

International Search Report and Written Opinion for International Application No. PCT/US2021/025035 mailed Aug. 12, 2021.

*Primary Examiner* — Joshua D Huson
*Assistant Examiner* — Vicente Rodriguez
(74) *Attorney, Agent, or Firm* — Thomas | Horstemeyer, LLP (57) ABSTRACT

The present disclosure presents systems, apparatuses, and methods of active flow controls for dissipating tip vortices. In this regard, a method comprises positioning one or more fan-shaped plasma actuators on an end surface of a tip of one or more airfoils of an aircraft, wherein the fan-shaped plasma actuators are surface compliant with the surface of the tip of the one or more airfoils; and activating the one or more fan-shaped plasma actuators during a flight of the aircraft, wherein at least one tip vortex generated by a flight of the aircraft is reduced by an introduction of one or more vortices generated by the one or more fan-shaped plasma actuators on the end surface of the tip of the one or more airfoils of the aircraft. Other systems, apparatuses, and methods are also presented.

18 Claims, 9 Drawing Sheets

(51) Int. Cl.
*B64C 21/06* (2023.01)
*B64C 21/08* (2023.01)
*B64C 23/06* (2006.01)
*F15D 1/12* (2006.01)
*H05H 1/24* (2006.01)

(58) Field of Classification Search
CPC ......... B64C 27/467; Y02T 50/10; F15D 1/12; H05H 1/2439
See application file for complete search history.

(56) References Cited

U.S. PATENT DOCUMENTS

| | | | | |
|---|---|---|---|---|
| 8,916,795 | B2* | 12/2014 | McClure | B64C 23/005 219/121.48 |
| 9,446,840 | B2* | 9/2016 | Drouin, Jr. | H05H 1/2439 |
| 10,446,373 | B2* | 10/2019 | Zimmerman | H05H 1/50 |
| 10,495,121 | B2* | 12/2019 | Smullin | B64C 23/005 |
| 2008/0145219 | A1* | 6/2008 | McVeigh | B64C 27/46 416/23 |
| 2010/0133386 | A1 | 6/2010 | Schwimley et al. | |
| 2014/0144517 | A1* | 5/2014 | Raja | B64C 23/005 422/186.21 |
| 2017/0088255 | A1 | 3/2017 | Nikic | |
| 2018/0007772 | A1 | 1/2018 | Roy | |

* cited by examiner

BLADE TIP VORTEX CONTROL

CROSS-REFERENCE TO RELATED APPLICATIONS

This application is the 35 U.S.C. § 371 national stage application of International Application No. PCT/US2021/025035, filed Mar. 31, 2021, which claims priority to U.S. provisional application entitled, "Blade Tip Vortex Control," having Ser. No. 63/004,582, filed Apr. 3, 2020, which is entirely incorporated herein by reference.

TECHNICAL FIELD

The present disclosure is generally related to active flow controls for dissipating tip vortices.

BACKGROUND

When a wing of an aircraft, such as a rotating wing or blade of a helicopter, generates aerodynamic lift, the air on the top surface of the wing has lower pressure relative to the bottom surface. This causes air to flow in a circular fashion from below the wing and out around the tip of the wing to the top of the wing creating an emergent circulatory flow pattern referred to as a blade tip or wing tip vortex. Blade tip vortices dissipate slowly and linger in the atmosphere long after the aircraft moves away which can become a hazard to other aircrafts, known as wake turbulence.

SUMMARY

Embodiments of the present disclosure provide systems, apparatuses, and methods of active flow controls for dissipating tip vortices. In this regard, one embodiment of such a method, among others, can be broadly summarized by positioning one or more fan-shaped plasma actuators on an end surface of a tip of one or more airfoils of an aircraft, wherein the fan-shaped plasma actuators are surface compliant with the surface of the tip of the one or more airfoils; and activating the one or more fan-shaped plasma actuators during a flight of the aircraft, wherein at least one tip vortex generated by a flight of the aircraft is reduced by an introduction of one or more vortices generated by the one or more fan-shaped plasma actuators on the end surface of the tip of the one or more airfoils of the aircraft.

Briefly described, one embodiment of the system, among others, can include one or more airfoils of an aircraft; one or more fan-shaped plasma actuators positioned on an end surface of a tip of the one or more airfoils of an aircraft, wherein the fan-shaped plasma actuators are surface compliant with the surface of the tip of the one or more airfoils; and a sinusoidal voltage source coupled to the one or more fan-shaped plasma actuators, wherein the voltage source is configured to activate the one or more fan-shaped plasma actuators during a flight of the aircraft in order to reduce at least one tip vortex generated by a flight of the aircraft by an introduction of one or more vortices generated by the one or more fan-shaped plasma actuators on the end surface of the tip of the one or more airfoils of the aircraft.

In one or more aspects for such systems and/or methods, an exemplary system/method can further perform operations comprising or be characterized by: positioning additional fan-shaped plasma actuators on a top surface of the one or more airfoils near the tip of the airfoil and activating the fan-shaped plasma actuators during the flight of the aircraft to reduce the at least one tip vortex generated by the flight of the aircraft; positioning serpentine plasma actuators on a top surface of the one or more airfoils near the tip of the airfoil and activating the serpentine plasma actuators during the flight of the aircraft to aid in the reduction of the at least one tip vortex generated by the flight of the aircraft; positioning plasma jet actuators on a top surface of the one or more airfoils near the tip of the airfoil and activating the plasma jet actuators during the flight of the aircraft to aid in the reduction of the at least one tip vortex generated by the flight of the aircraft; positioning additional fan-shaped plasma actuators on a bottom surface of the one or more airfoils near the tip of the airfoil and activating the fan-shaped plasma actuators during the flight of the aircraft to reduce the at least one tip vortex generated by the flight of the aircraft; positioning serpentine plasma actuators on a bottom surface of the one or more airfoils near the tip of the airfoil and activating the serpentine plasma actuators during the flight of the aircraft to aid in the reduction of the at least one tip vortex generated by the flight of the aircraft; and/or positioning plasma jet actuators on a bottom surface of the one or more airfoils near the tip of the airfoil and activating the plasma jet actuators during the flight of the aircraft to aid in the reduction of the at least one tip vortex generated by the flight of the aircraft.

In one or more aspects for such systems and/or methods, the one or more airfoils comprise at least one blade of a rotary-wing aircraft; and/or the one or more airfoils comprise at least one wing of a fixed-wing aircraft. In one or more aspects for such systems and/or methods, airfoil self-noise is reduced via activation of the one or more fan-shaped plasma actuators.

Other systems, methods, features, and advantages of the present disclosure will be or become apparent to one with skill in the art upon examination of the following drawings and detailed description. As an additional example, one embodiment of a method, among others, comprises positioning one or more blowing holes on an end surface of a tip of one or more airfoils of an aircraft; positioning one or more serpentine plasma actuators on a top or bottom surface of the one or more airfoils near the tip of the airfoil; and activating the one or more blowing holes and the one or more serpentine plasma actuators during a flight of the aircraft, wherein at least one tip vortex generated by a flight of the aircraft is reduced by an introduction of one or more airflows generated by the one or more blowing holes on the end surface of the tip and the one or more serpentine plasma actuators on the top or bottom surface of the one or more airfoils of the aircraft.

It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure describes various embodiments of systems, apparatuses, and methods of active flow controls for dissipating tip vortices. A blade tip vortex (BTV) is generated by the motion of a blade through the air at an angle of attack. BTV is of significant interest to the aircraft and helicopter community. For example, the formation and growth of the blade tip vortex structure have been critical in understanding the induced velocity field surrounding the rotary-wing aircraft that is key to achieving a stable flight with reduced drag and vortex-induced noise (airfoil self-noise). Consequently, a large amount of research has been conducted into the measurement and simulation of the development of the blade tip vortices trailed into the wakes of helicopter rotors, and the resulting blade vortex interactions (BVI) and vortex-airframe interactions. NASA Reference Publication 1258 (1991) has documented that small changes in the tip vortex structures and their relative locations to the rotor blades can have a substantial impact on BVI noise. For fixed-wing aircraft, BTVs are fundamentally related to the three-dimensional lift generation mechanism and induced drag. For formation flights, the wake turbulence due to BTV can be dangerous for the following aircraft. The reduction of rotor noise (airfoil self-noise) is also an extremely important goal in the design of military and civil rotorcraft for stealth and passenger comfort, respectively.

Over the years, several methods have explored dissipating the strength of tip vortices employing some form of simple passive flow-control devices or surface contouring. Albeit effective for a certain flow regime, these methods generally incur adverse effects on overall rotor performance due to their passive nature. In accordance with various embodiments of the present disclosure, novel active control methods and systems are presented to dissipate and break down the BTVs at the source and during formation. Exemplary systems and methods of active control in accordance with various embodiments of the present disclosure include one or more of the following elements: (a) Using plasma fan-shaped actuators, serpentine plasma actuators, and/or plasma jet actuators on receptive locations of an airfoil (e.g., aircraft wing or helicopter blade) at location A (bottom/pressure side near edge), B (edge tip portion), C (upper/suction side near edge), and/or D (top/suction side away from edge); (b) Using plasma jets (e.g., microjets) on receptive locations A, B, C, and/or D of the tip of the airfoil; (c) Using blowing plasma jets or suction holes on receptive locations A, B, C, and/or D of the airfoil; and/or (d) Using drilled holes connecting A, B, C, and/or D of the tip of the airfoil, such as holes or channels connecting A and C and/or B and D.

Plasma actuators with curved or non-straight geometries, including, but not limited to, the fan-shaped and serpentine geometry, are able to introduce streamwise, as well as spanwise and surface normal vorticity to and promote increased mixing in the flow. The manner that three-dimensional perturbations can be introduced to the flow allows for additional freedom when designing and implementing control. In various embodiments, the plasma actuator(s) comprises dielectric barrier discharge actuators having two asymmetrically placed electrodes separated by a dielectric material and exposed to a working gas on one side, while the other side was covered. For the non-straight shaped actuators, one of the electrodes is grounded, while the other can be operated with a sinusoidal voltage source. The difference in electrical potential creates a significant electric field, which weakly ionizes the ambient air in the immediate region. The combination of the electric field and charged particles induces a body force to the fluid, which can, in turn, be used for flow control applications.

A serpentine plasma actuator is characterized as a dielectric barrier discharge actuator where the electrodes are shaped such that they can be described by a continuous parametric function that is periodic is some direction. While the function itself is not constrained to be any specific shape, the shape of the serpentine electrodes for actuator can include geometries based on arcs, rectangles, combs/fingers, and triangles. In a fan-shaped plasma actuator, the combination of forces induced by blades and the central arc of the electrodes in the fan shape results in a suction of the air near the electrode perimeter followed by an ejection of air leading to a formation of vortical structures. Accordingly, an introduction of airflow near the location of an outer edge portion of a tip of the airfoil can partially reduce the strength of a tip vortex. In particular, the plasma actuator can direct a flow of fluid outwardly from the tip of the airfoil that acts to dissipate tip vortices after they are generated.

In various embodiments, the plasma actuator can be located on the surface of the airfoil and used to reduce drag and increase around the airfoil surface. An exemplary plasma actuator can be attached to the surface or mounted essentially flush to the surface. For example, the plasma actuator can be mounted into the surface or applied to an existing surface using various laminating technologies, adhesive attachment, bonding, etc.

Figure 1A:
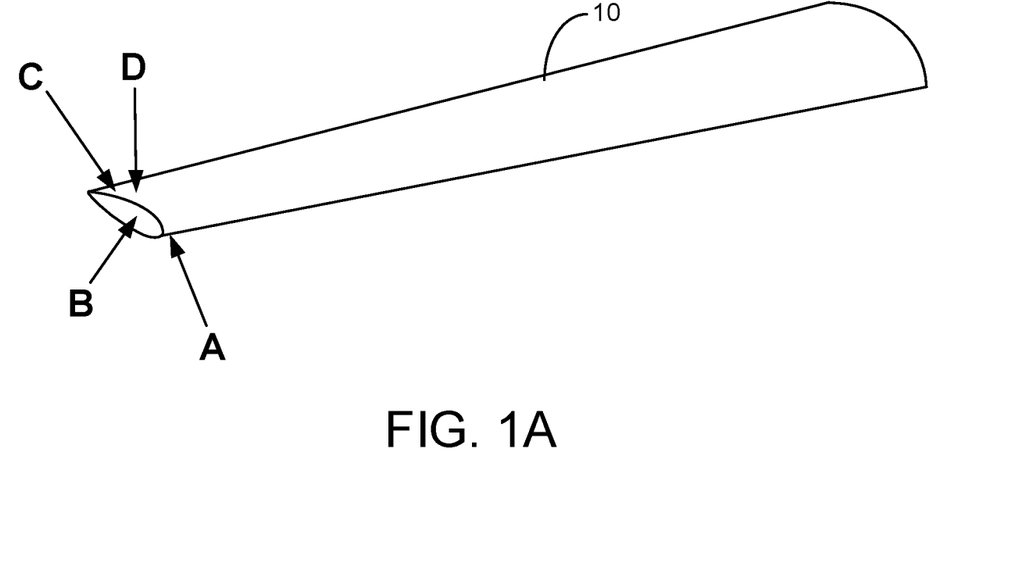
FIGS. 1A-1B shows locations of an airfoil upon which exemplary active flow controls can be positioned in accordance with various embodiments of the present disclosure.
Figure 1B:
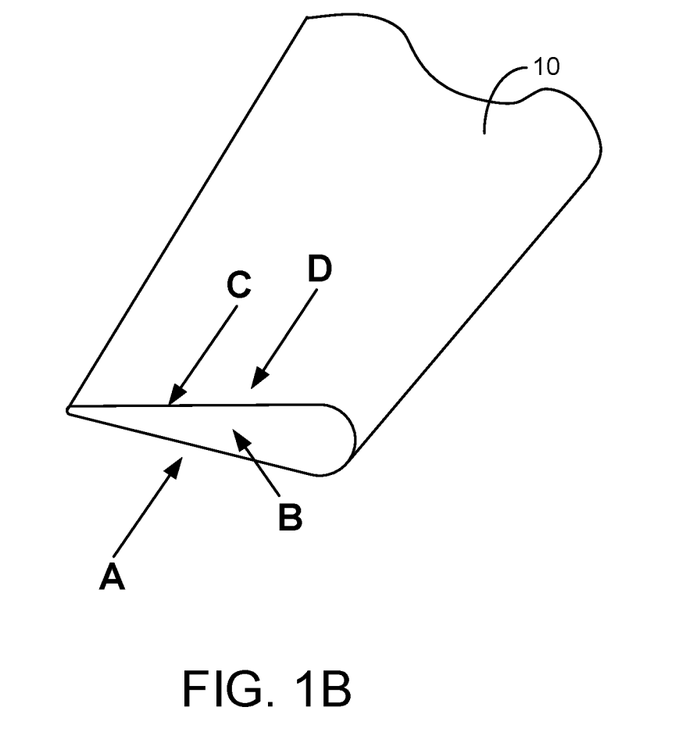
Figure 1C:
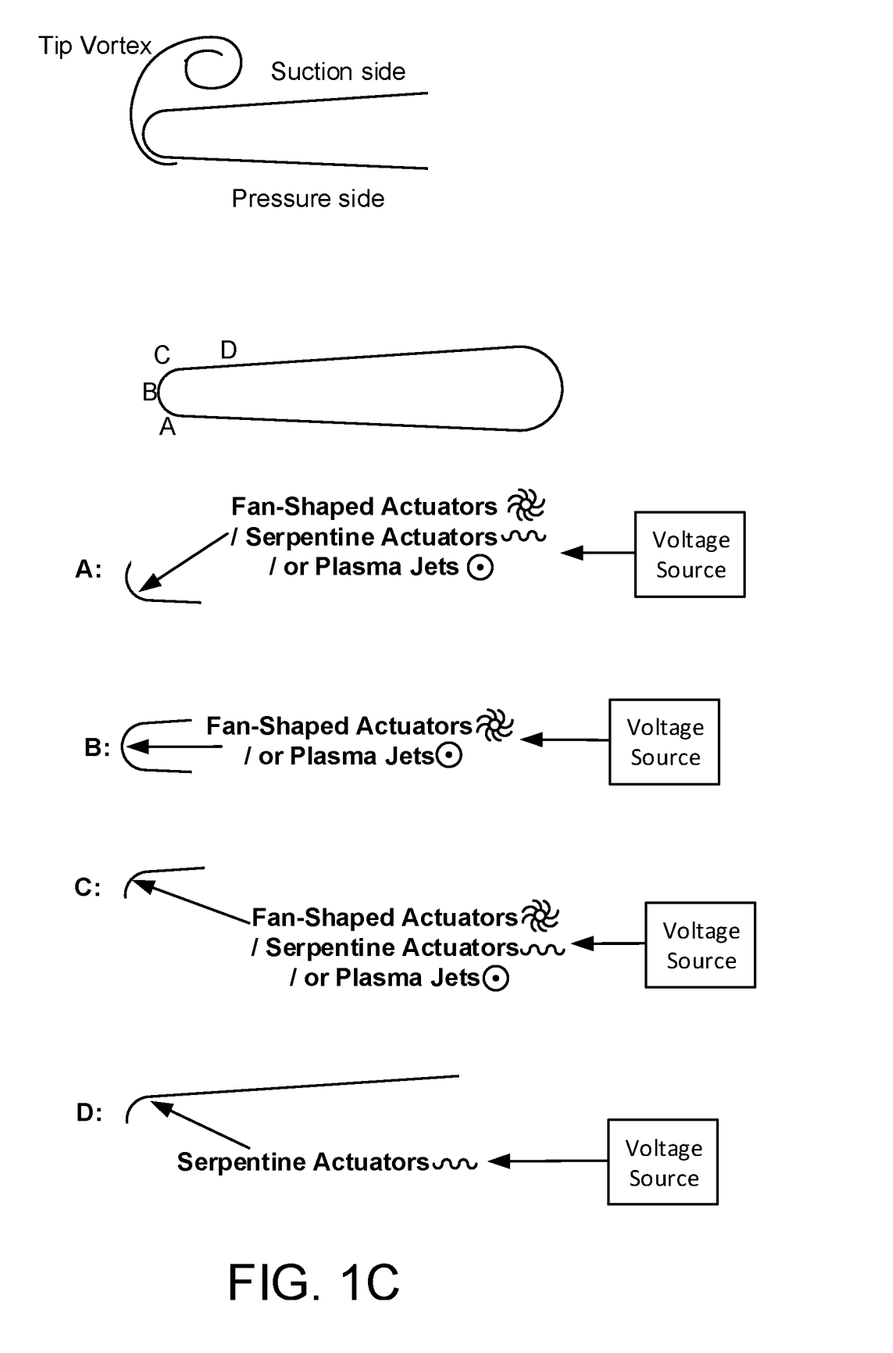
FIG. 1C shows a computer-generated schematic for active flow controls at various locations of the airfoil identified in FIGS. 1A-1B in accordance with various embodiments of the present disclosure.

As discussed above, plasma fan-shaped actuators and/or serpentine plasma actuators can be positioned on receptive locations of an airfoil 10 (FIGS. 1A-1B) (e.g., aircraft wing or helicopter blade) at locations or arrangements corresponding to A (bottom/pressure side near edge), B (edge tip portion), C (upper/suction side near edge), and/or D (top/suction side away from edge) and activated via a voltage source. FIGS. 1A-1B shows the locations of A, B, C, and D on an exemplary airfoil 10, and FIG. 1C shows various concepts for dissipating or breaking down tip vortices at various locations of the airfoil 10 identified in FIGS. 1A-1B, in accordance with various embodiments of the present disclosure.

In particular, Arrangement "A" shows that fan-shaped or serpentine plasma actuators and/or plasma jets can be positioned on a bottom or pressure side surface of the airfoil, in which the positioning of the actuators allows for the generated airflow to push air down from the bottom surface of the airfoil which can dissipate tip vortices (e.g., blade tip vortices) from forming.

Arrangement "B" shows that fan-shaped plasma actuators and/or plasma jets can be positioned on the tip end of an airfoil. The blowing direction of the actuators can be inward and/or outward in various embodiments. The introduction of airflow at the tip of the airfoil can reduce the strength of a blade tip vortex.

Arrangement "C" shows that serpentine or fan-shaped plasma actuators and/or plasma jet actuators on a suction side or top side of airfoil near a slanted side of the airfoil next to the tip. The blowing direction is either in or out, in which the introduction of airflow near a tip of the airfoil can act to break up a tip vortex.

Arrangement "D" shows that serpentine plasma actuators can be positioned on a suction side surface or top side of an airfoil in a spanwise direction on a flat side of the airfoil away from the tip. In various embodiments, the flow is induced at an angle to generate counter-rotating vortex pairs (CVP) that can act to break down tip vortices.

Figure 2:
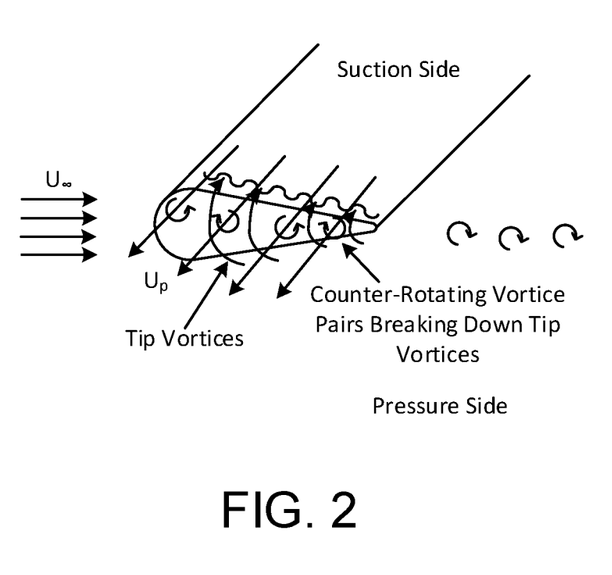
FIG. 2 shows a computer-generated schematic depicting serpentine plasma actuators at Arrangement D of FIGS. 1A-1B in accordance with various embodiments of the present disclosure.
Figure 3:
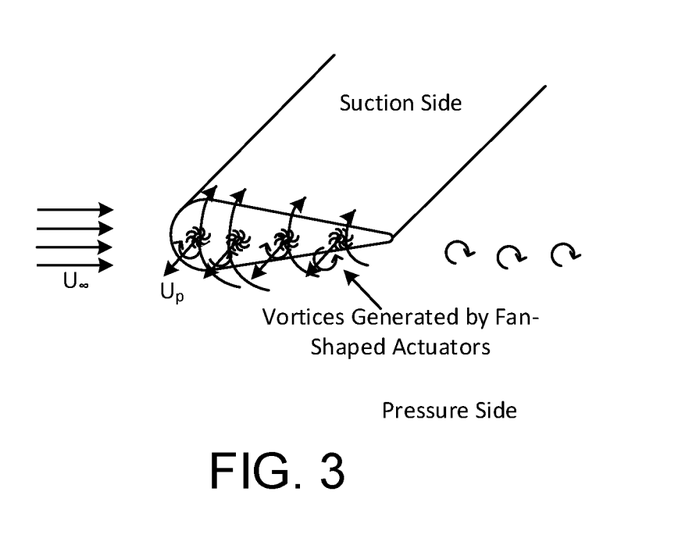
FIG. 3 shows a computer-generated schematic depicting fan-shaped plasma actuators at Arrangement B of FIGS. 1A-1B in accordance with various embodiments of the present disclosure.
Figure 4:
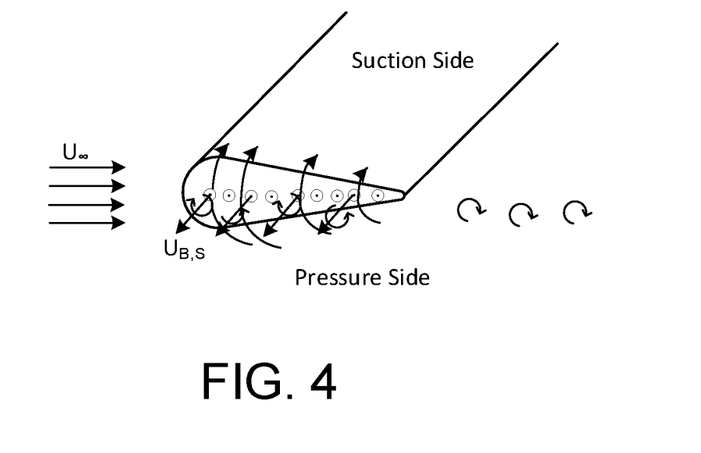
FIG. 4 shows a computer-generated schematic depicting actuation of induced airflows via blowing holes or suction holes at Arrangement B of FIGS. 1A-1B in accordance with various embodiments of the present disclosure.

Representative embodiments of plasma actuators and their placements on various surfaces are shown in FIGS. 2, 3, and 4. Correspondingly, FIG. 2 shows a serpentine plasma actuator in accordance with Arrangement D, which is at a suction side (top) of an airfoil near the flat edge of a tip of the airfoil. The serpentine plasma actuator runs transverse to a spanwise axis of the airfoil. Accordingly, the counter-rotating vortex pairs produced by the serpentine plasma actuators can break down tip vortices. In the figure, $U_\infty$ represents the freestream flow direction, and $U_p$ represents the mean plasma-induced flow direction which is perpendicular to the tip vortex direction (that rolls around the tip edge of the airfoil). Accordingly, the concept described in FIG. 2 applies a surface compliant plasma actuator to control and break up tip vortices using ambient air.

Next, FIG. 3 shows actuation of fan-shaped plasma actuators on a tip end surface of an airfoil 10 in accordance with Arrangement B. Therefore, upon actuation, vortices can be generated by the fan-shaped actuators. In the figure, $U_\infty$ represents the freestream flow direction and $U_p$ represents the mean plasma-induced flow which is perpendicular to the tip vortex direction (that rolls around the tip of the airfoil). In this arrangement, vortices generated by the fan-shaped actuator(s) can act to break up tip vortices. Accordingly, the concept described in FIG. 3 applies a fan-shaped plasma actuator that is surface compliant to control and break up tip vortices using ambient air as opposed to using mechanical fans or pressurized fluid from an external source.

FIG. 4 shows actuation of induced airflows at Arrangement B corresponding to a tip end surface of the airfoil. Similar actuation can also be provided for Arrangement C on a slanted surface near the airfoil tip on an upper or bottom surface of the airfoil. The figures show blowing holes or suction holes at the tip end surface that are connected to a planar chamber inside the wing, blade, or airfoil. $U_{b,s}$ represents the mean blowing or suction induced flow that is perpendicular to the tip vortex direction. $U_\infty$ represents the free stream flowing direction. Accordingly, airflow at a positive or negative pressure can be introduced by the holes at the tip end surface. For the airflow at the positive pressure, airflow can be supplied plasma jets within the internal chamber or by pressurized fluid from an external source. The airflow introduced by the holes in the tip end surface can act to dissipate and break up tip vortices.

Figure 5A:
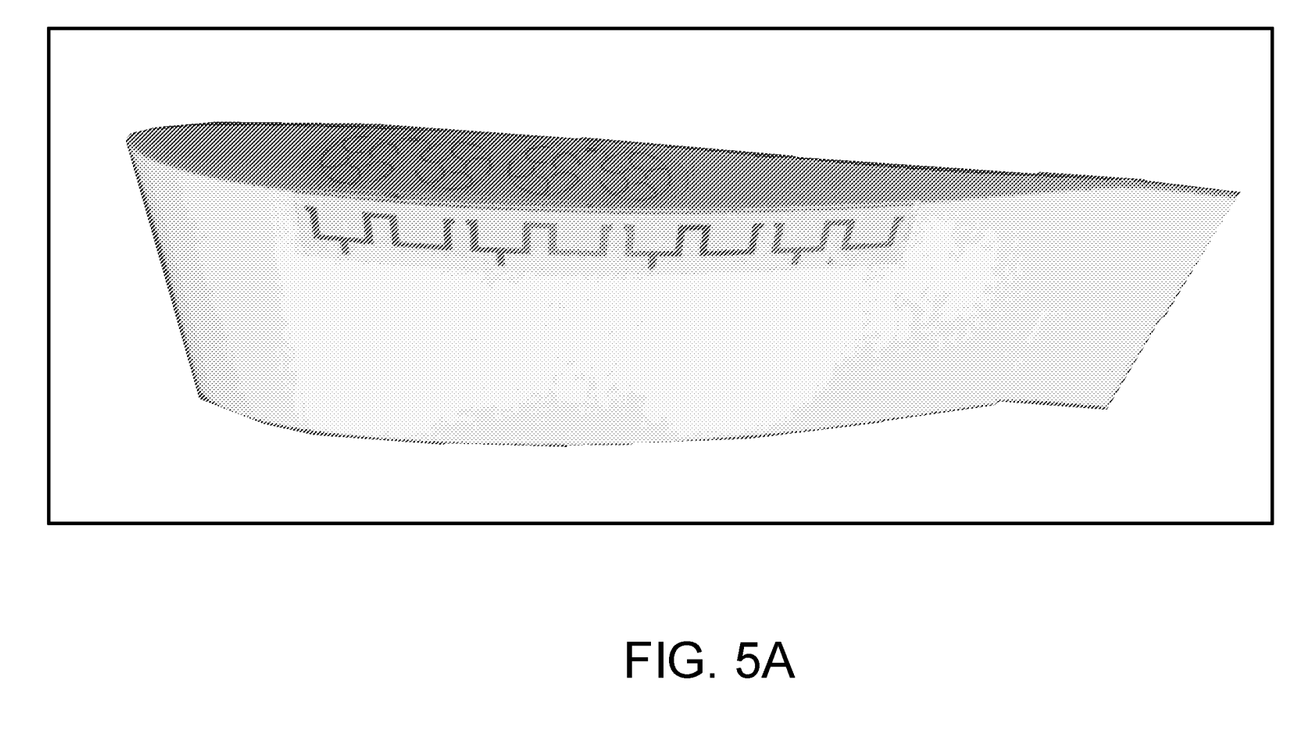
FIGS. 5A and 5B show fan-shaped actuators on a tip side and serpentine actuators attached on a suction side of a 3D printed prototype of an airfoil in accordance with various embodiments of the present disclosure.
Figure 5B:
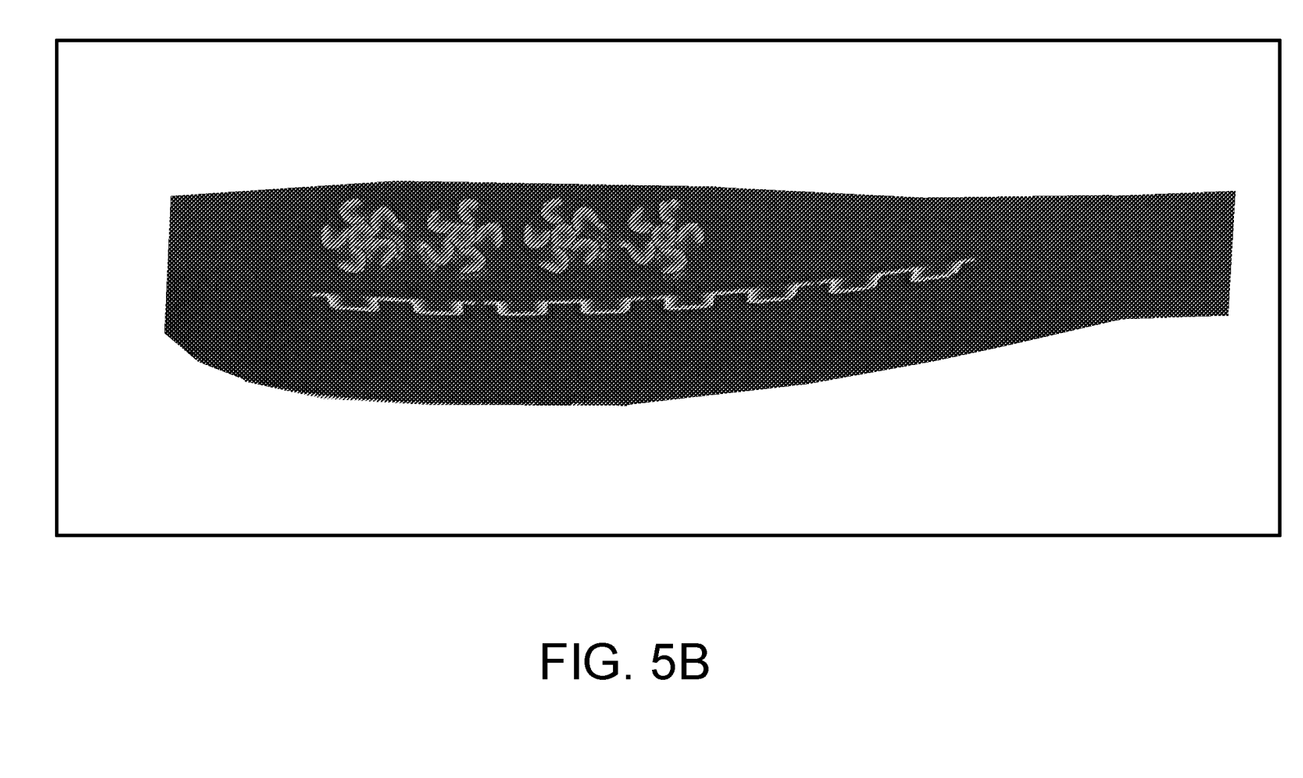

In various embodiments, plasma actuators or other flow-inducing devices can be used in various combinations. For example, FIGS. 5A-5B show a combination of Arrangement B and Arrangement C. In the figure, fan-shaped plasma actuators are positioned on a tip end surface of an airfoil in accordance with Arrangement B, and serpentine plasma actuators are positioned on a top slanted surface of the airfoil near the tip in accordance with Arrangement C. Thus, FIG. 5A shows fan-shaped actuators on the tip side and serpentine actuators attached on the suction side of a 3D printed prototype of an airfoil.

For testing purposes, the airfoil was placed in a wind tunnel and the actuators were turned on or activated with an 8 kV peak to peak voltage and 9 kHz alternating frequency, in which the combined power consumption rate for both actuators was 6.41 Watts. As shown in FIG. 5B, the formation of plasmas on the fan and the serpentine actuators were visible to the naked eye with normal ambient lighting when the actuators were turned on inside a wind tunnel.

Figure 6A:
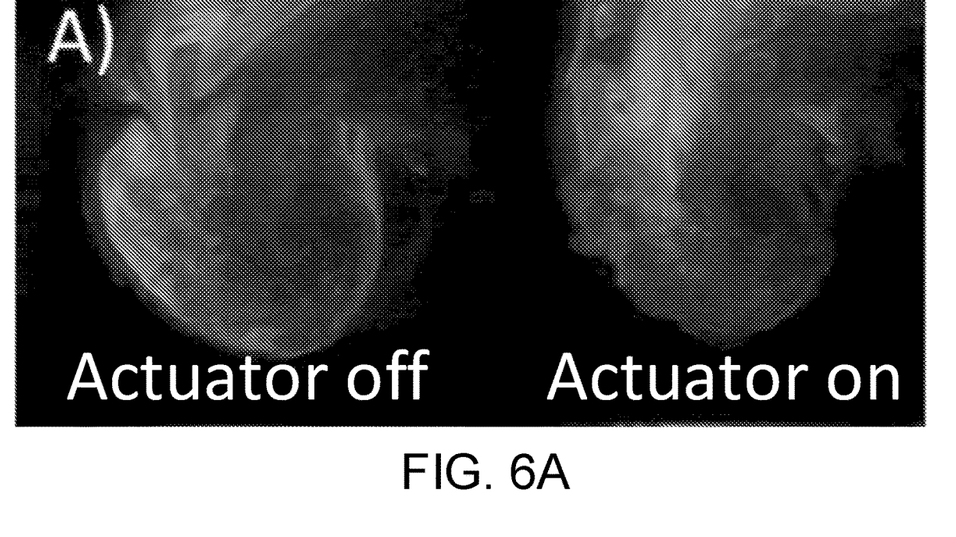
FIGS. 6A-6D show instantaneous images for the actuators of FIGS. 5A and 5B turned OFF (left) and the actuators turned ON (right) in accordance with the present disclosure.
Figure 6B:
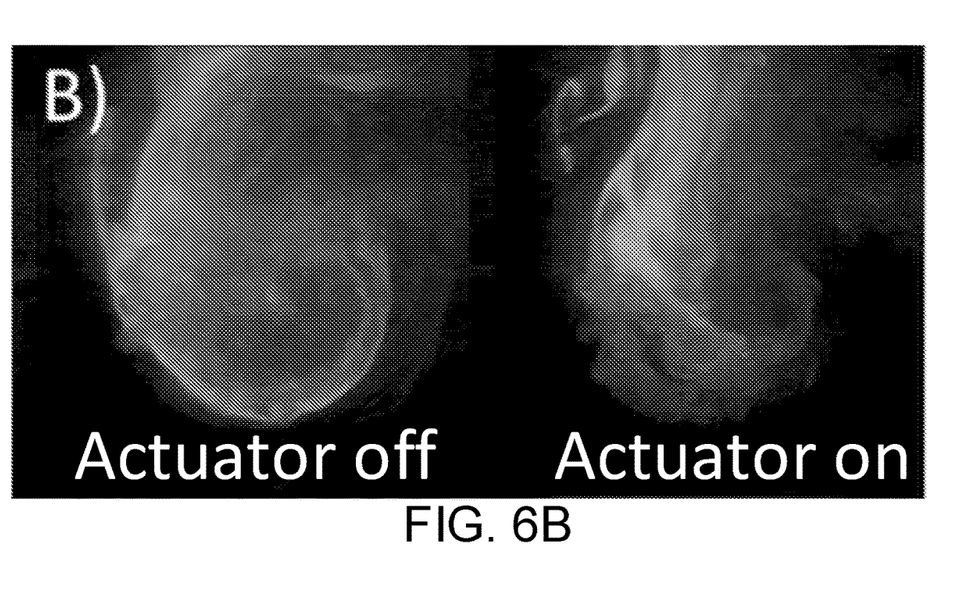
Figure 6C:
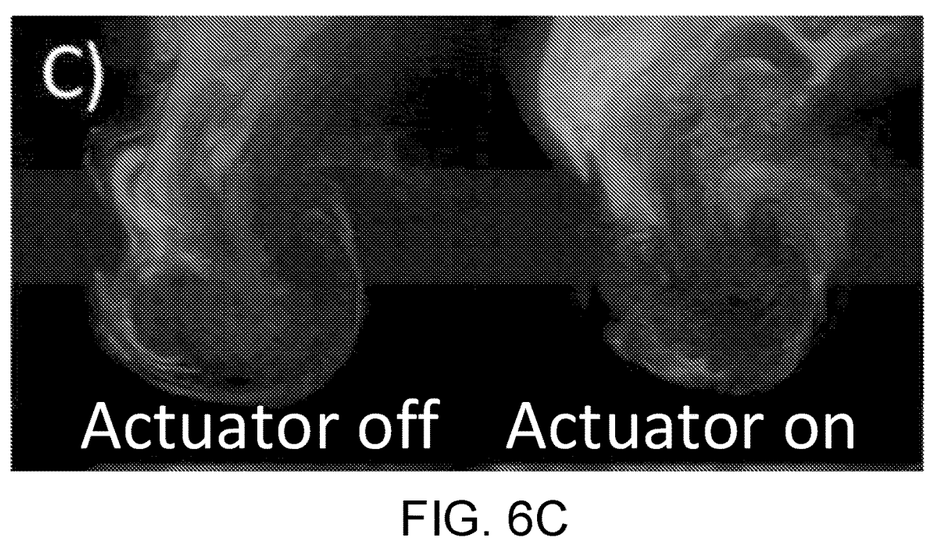
Figure 6D:
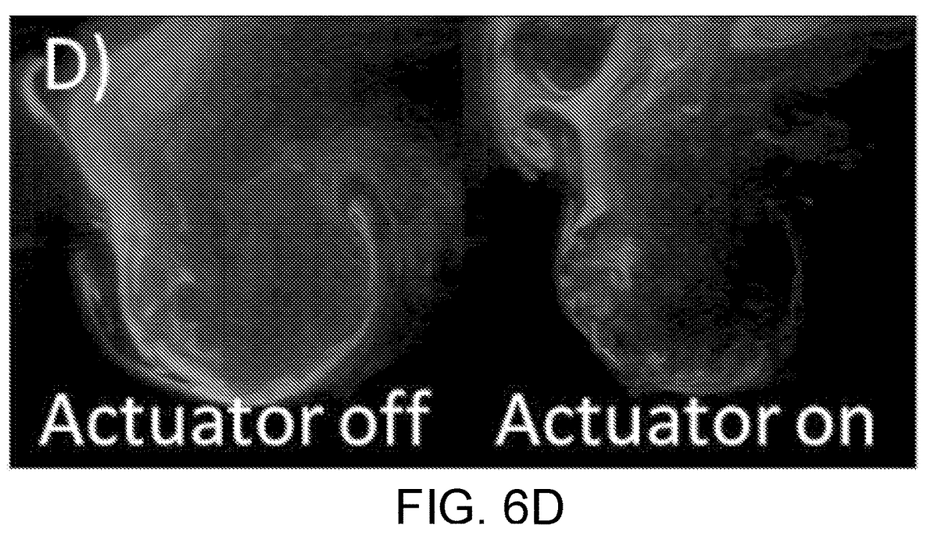

FIGS. 6A-6D shows the instantaneous images for the actuators (in FIGS. 5A-5B) turned OFF (left) and the actuators turned ON (right) or activated which show the influence of plasma actuation on the temporal evolution of the tip vortex structure. In particular, the figures show a temporal growth and decay of the two sets of representative instantaneous images of tip vortices on the laser plane. On the left are the images when the actuators are turned off, and on the right are the images when the actuators are turned on. From the images, it is apparent that the vortex remains relatively coherent when the actuators are turned off while the outer structure of the tip vortex keeps collapsing and reforming when the actuators are turned on. As seen by the instantaneous images, it is difficult to determine the core size change. To overcome the limitations of instantaneous data, the series of collected images were averaged over a period of 3.7 seconds. From the images, the distinguishable difference in vortex size is notable, in which the darker region in FIG. 6B and FIG. 6D represents a lack of illuminated particles and hence a weaker vortex.

In accordance with the present disclosure, embodiments of the present disclosure use a combination of plasma jets, fans, actuators to reduce lift/drag ratio to control vortices on plane and helicopter blades and can result in improved fuel economy and noise reduction.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A method of reducing tip vortices comprising:
    positioning one or more fan-shaped plasma actuators on an end surface of a tip of one or more airfoils of an aircraft, wherein the one or more fan-shaped plasma actuators comprise dielectric barrier discharge actuators having two asymmetrically placed electrodes separated by a dielectric material which are configured to ionize ambient air into plasma, wherein an individual fan-shaped plasma actuator comprises a plurality of bent blade members that radially extend from a circular center of the individual fan-shaped plasma actuator;
    activating the one or more fan-shaped plasma actuators during a flight of the aircraft, wherein at least one tip vortex generated by a flight of the aircraft is reduced by an introduction of one or more vortices generated by the one or more fan-shaped plasma actuators on the end surface of the tip of the one or more airfoils of the aircraft.

2. The method of claim 1, further comprising positioning additional fan-shaped plasma actuators on a top surface of the one or more airfoils near the tip of the airfoil and activating the fan-shaped plasma actuators during the flight of the aircraft to reduce the at least one tip vortex generated by the flight of the aircraft.

3. The method of claim 1, further comprising positioning serpentine plasma actuators on a top surface of the one or more airfoils near the tip of the airfoil and activating the serpentine plasma actuators during the flight of the aircraft to aid in the reduction of the at least one tip vortex generated by the flight of the aircraft.

4. The method of claim 1, further comprising positioning plasma jet actuators on a top surface of the one or more airfoils near the tip of the airfoil and activating the plasma jet actuators during the flight of the aircraft to aid in the reduction of the at least one tip vortex generated by the flight of the aircraft.

5. The method of claim 1, further comprising positioning additional fan-shaped plasma actuators on a bottom surface of the one or more airfoils near the tip of the airfoil and activating the fan-shaped plasma actuators during the flight of the aircraft to reduce the at least one tip vortex generated by the flight of the aircraft.

6. The method of claim 1, further comprising positioning serpentine plasma actuators on a bottom surface of the one or more airfoils near the tip of the airfoil and activating the serpentine plasma actuators during the flight of the aircraft to aid in the reduction of the at least one tip vortex generated by the flight of the aircraft.

7. The method of claim 1, further comprising positioning plasma jet actuators on a bottom surface of the one or more airfoils near the tip of the airfoil and activating the plasma jet actuators during the flight of the aircraft to aid in the reduction of the at least one tip vortex generated by the flight of the aircraft.

8. The method of claim 1, wherein the one or more airfoils comprise at least one blade of a rotary-wing aircraft.

9. The method of claim 1, wherein the one or more airfoils comprise at least one wing of a fixed-wing aircraft.

10. The method of claim 1, wherein airfoil self-noise is reduced via activation of the one or more fan-shaped plasma actuators.

11. A system of reducing tip vortices comprising:
one or more airfoils of an aircraft;
one or more fan-shaped plasma actuators positioned on an end surface of a tip of the one or more airfoils of an aircraft, wherein the one or more fan-shaped plasma actuators comprise dielectric barrier discharge actuators having two asymmetrically placed electrodes separated by a dielectric material which are configured to ionize ambient air into plasma, wherein an individual fan-shaped plasma actuator comprises a plurality of bent blade members that radially extend from a circular center of the individual fan-shaped plasma actuator; and
a sinusoidal voltage source coupled to the one or more fan-shaped plasma actuators, wherein the sinusoidal voltage source is configured to activate the one or more fan-shaped plasma actuators during a flight of the aircraft in order to reduce at least one tip vortex generated by a flight of the aircraft by an introduction of one or more vortices generated by the one or more fan-shaped plasma actuators on the end surface of the tip of the one or more airfoils of the aircraft.

12. The system of claim 11, wherein airfoil self-noise is reduced via activation of the one or more fan-shaped plasma actuators.

13. The system of claim 11, further comprising additional fan-shaped plasma actuators positioned on a top surface of the one or more airfoils near the tip of the airfoil, wherein the sinusoidal voltage source is configured to activate the fan-shaped plasma actuators during the flight of the aircraft to reduce the at least one tip vortex generated by the flight of the aircraft.

14. The system of claim 11, further comprising serpentine plasma actuators positioned on a top surface of the one or more airfoils near the tip of the airfoil, wherein the sinusoidal voltage source is configured to activate the serpentine plasma actuators during the flight of the aircraft to aid in the reduction of the at least one tip vortex generated by the flight of the aircraft.

15. The system of claim 11, further comprising plasma jet actuators positioned on a top surface of the one or more airfoils near the tip of the airfoil, wherein the sinusoidal voltage source is configured to activate the plasma jet actuators during the flight of the aircraft to aid in the reduction of the at least one tip vortex generated by the flight of the aircraft.

16. The system of claim 11, further comprising additional fan-shaped plasma actuators positioned on a bottom surface of the one or more airfoils near the tip of the airfoil, wherein the sinusoidal voltage source is configured to activate the fan-shaped plasma actuators during the flight of the aircraft to reduce the at least one tip vortex generated by the flight of the aircraft.

17. The system of claim 11, further comprising serpentine plasma actuators positioned on a bottom surface of the one or more airfoils near the tip of the airfoil, wherein the sinusoidal voltage source is configured to activate the serpentine plasma actuators during the flight of the aircraft to aid in the reduction of the at least one tip vortex generated by the flight of the aircraft.

18. The system of claim 11, further comprising plasma jet actuators positioned on a bottom surface of the one or more airfoils near the tip of the airfoil, wherein the sinusoidal voltage source is configured to activate the plasma jet actuators during the flight of the aircraft to aid in the reduction of the at least one tip vortex generated by the flight of the aircraft.

* * * * *